United States Patent [19]
Saito

[11] Patent Number: 6,097,892
[45] Date of Patent: *Aug. 1, 2000

[54] VIEWFINDER SYSTEM AND OPTICAL APPARATUS HAVING THE SAME

[75] Inventor: Hiroshi Saito, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/828,265

[22] Filed: Mar. 21, 1997

[30] Foreign Application Priority Data

Mar. 29, 1996 [JP] Japan .................................. 8-103367

[51] Int. Cl.[7] .................................................. G03B 17/00
[52] U.S. Cl. ................................................... 396/51
[58] Field of Search ........................................ 396/51

[56] References Cited

U.S. PATENT DOCUMENTS 5,581,323 12/1996 Suzuki et al. ............................. 396/51
5,583,606 12/1996 Shindo et al. ............................. 396/51
5,606,390 2/1997 Arai et al. ................................. 396/51
5,610,681 3/1997 Nagano et al. ............................ 396/51
5,689,736 11/1997 Okuyama et al. ......................... 396/51
5,696,998 12/1997 Yamada et al. ............................ 396/51

FOREIGN PATENT DOCUMENTS

6163 1/1994 Japan .

*Primary Examiner*—W. B. Perkey
*Attorney, Agent, or Firm*—Robin, Blecker & Daley

[57] ABSTRACT

A viewfinder system includes an eyepiece lens having at least one aspheric surface, and a visual line detecting part. The visual line detecting part includes an illuminating part for illuminating an eyeball of a viewer, a visual line lens arranged to form an eyeball image by using light reflected from the eyeball of the viewer, the visual line lens having at least one aspheric surface, and a detection part on which the eyeball image is formed. The visual line detecting part is arranged to detect a visual line of the viewer by using information outputted from the detection part.

23 Claims, 5 Drawing Sheets

VIEWFINDER SYSTEM AND OPTICAL APPARATUS HAVING THE SAME

BACKGROUND OF THE INVENTION

1. Field of the Invention

This invention relates to a viewfinder system adapted for a photographic camera, a video camera or the like, and more particularly to a viewfinder system arranged such that, when a viewer (camera operator) views through an eyepiece lens a viewing plane (focal plane) on which a viewfinder image (object image) is formed, the viewfinder system detects a visual line of the viewer, so that shooting actions such as a distance measuring action (automatic focusing), a light measuring action, etc., are performed by using information on the visual line detected.

2. Description of Related Art

Visual-line detecting devices for detecting which point on a viewing plane a viewer is viewing, i.e., for detecting a visual line (a visual axis) of the viewer, have heretofore been variously proposed. For example, in Japanese Laid-Open Patent Application No. SHO 61-172552, there is disclosed a device in which a parallel light beam is projected from a light source onto the anterior segment of the eye to be detected and a visual axis (fixation point) is found by using a cornea-reflected image (Purkinje image) resulting from light reflected from a cornea and a position where an image of a pupil is formed.

Figure 1:
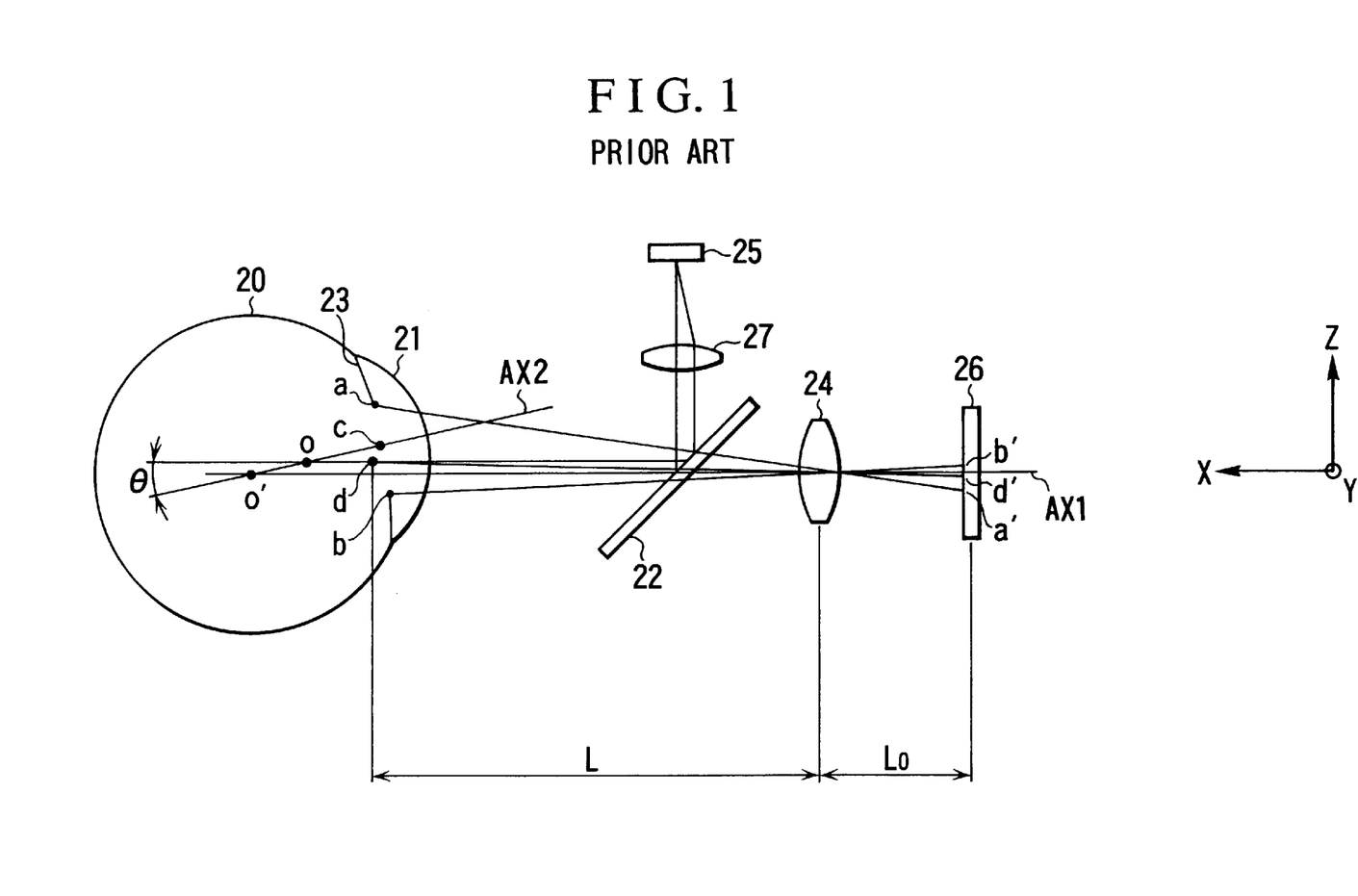
FIG. 1 is a diagram for explaining the principle of the conventional visual-line detecting method.

FIG. 1 is a diagram for explaining the principle of the conventional visual-line detecting method.

Referring to FIG. 1, a light source 25 such as a light emitting diode is disposed on the focal plane of a light projection lens 27 to project an insensible infrared light onto the viewer. The infrared light emitted from the light source 25 is made into parallel rays of light by the light projection lens 27. The parallel rays of light are reflected by a half mirror 22 to illuminate the cornea 21 of the eyeball 20 of the viewer. Then, a cornea-reflected image (Purkinje image) d resulting from a part of the infrared light reflected by the surface of the cornea 21 passes through the half mirror 22 and is condensed by a visual line lens 24 to form again an image d' on an image sensor 26.

Light beams from the end parts a and b of the iris 23 are guided through the half mirror 22 and the visual line lens 24 to the surface of the image sensor 26 to form images a' and b' of the end parts a and b of the iris 23. If the rotation angle θ of the optical axis AX2 of the eyeball 20 relative to the optical axis AX1 of the visual line lens 24 is small, with the Z-coordinates of the end parts a and b of the iris 23 assumed to be Za and Zb, respectively, the Z-coordinate Zc of the center c of the iris 23 can be expressed as follows:

$$Zc \approx \frac{Za + Zb}{2} \quad (a)$$

Further, with the Z-coordinate of the position where the cornea-reflected image d is generated assumed to be Zd and a distance from the center of curvature o of the cornea 21 to the center c of the iris 23 to be oc, the rotation angle θ of the optical axis AX2 of the eyeball 20 approximately satisfies the following relation formula:

$$oc \cdot \sin\theta \approx Zc - Zd$$

Therefore, the rotation angle θ of the optical axis AX2 of the eyeball 20 can be obtained by detecting the positions of the singular points (the cornea-reflected image d and the end parts a and b of the iris 23) projected on the image sensor 26. For this purpose, the formula (a) is changed to the following formula (b):

$$\beta \cdot oc \cdot \sin\theta \approx \frac{Za' + Zb'}{2} - Zd' \quad (b)$$

In the formula (b), β represents a magnification determined by a distance L between the generated position of the cornea-reflected image d and the visual line lens 24 and a distance $L_0$ between the visual line lens 24 and the image sensor 26. The distance $L_0$ can be obtained in some suitable manner.

With a visual-line detecting device applied to the viewfinder system of, for example, a photographic camera, a video camera or the like, in order to accurately detect the visual line of the viewer (camera operator) who is looking into the viewfinder system, it is important to have an image which is reflected from the eyeball (eyeball image) accurately formed (with a high degree of resolution) on the image sensor. Generally, the eyeball image can be accurately formed on the image sensor by arranging each of an image forming system (a visual-line detecting optical system) and an eyepiece lens to be composed of a plurality of lenses. That arrangement, however, causes the whole optical system to become complex and large. Then, it becomes difficult to place such a large and complex optical system inside a small limited space available within a camera or the like.

BRIEF SUMMARY OF THE INVENTION

It is an object of this invention to provide a viewfinder system in which a visual line detecting device is arranged to be capable of accurately detecting visual line information and yet the whole optical system of the viewfinder system is simply arranged by appositely setting the lens arrangement thereof.

To attain the above-stated object, a viewfinder system according to this invention comprises an eyepiece lens having at least one aspheric surface, and visual line detecting means. The visual line detecting means includes illuminating means for illuminating an eyeball of a viewer, a visual line lens arranged to form an eyeball image by using light reflected from the eyeball of the viewer, the visual line lens having at least one aspheric surface, and detection means on which the eyeball image is formed. The visual line detecting means is arranged to detect a visual line of the viewer by using information outputted from the detection means.

The above and other objects and features of this invention will become apparent from the following detailed description of an embodiment thereof taken in connection with the accompanying drawings.

DETAILED DESCRIPTION OF THE INVENTION

Hereinafter, a preferred embodiment of this invention will be described in detail with reference to the drawings.

Figure 2:
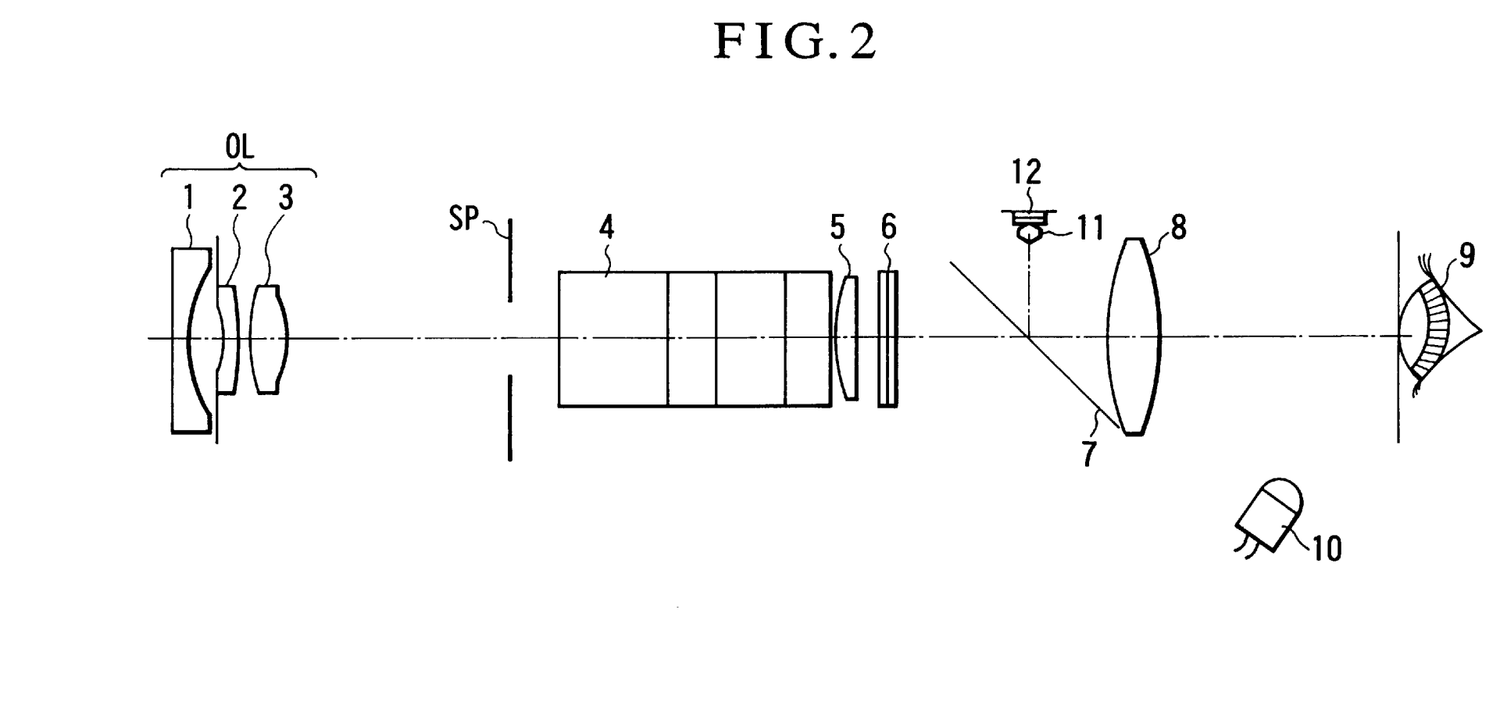
FIG. 2 schematically shows essential parts of a viewfinder system of a numerical example 1 of this invention.
Figure 3:
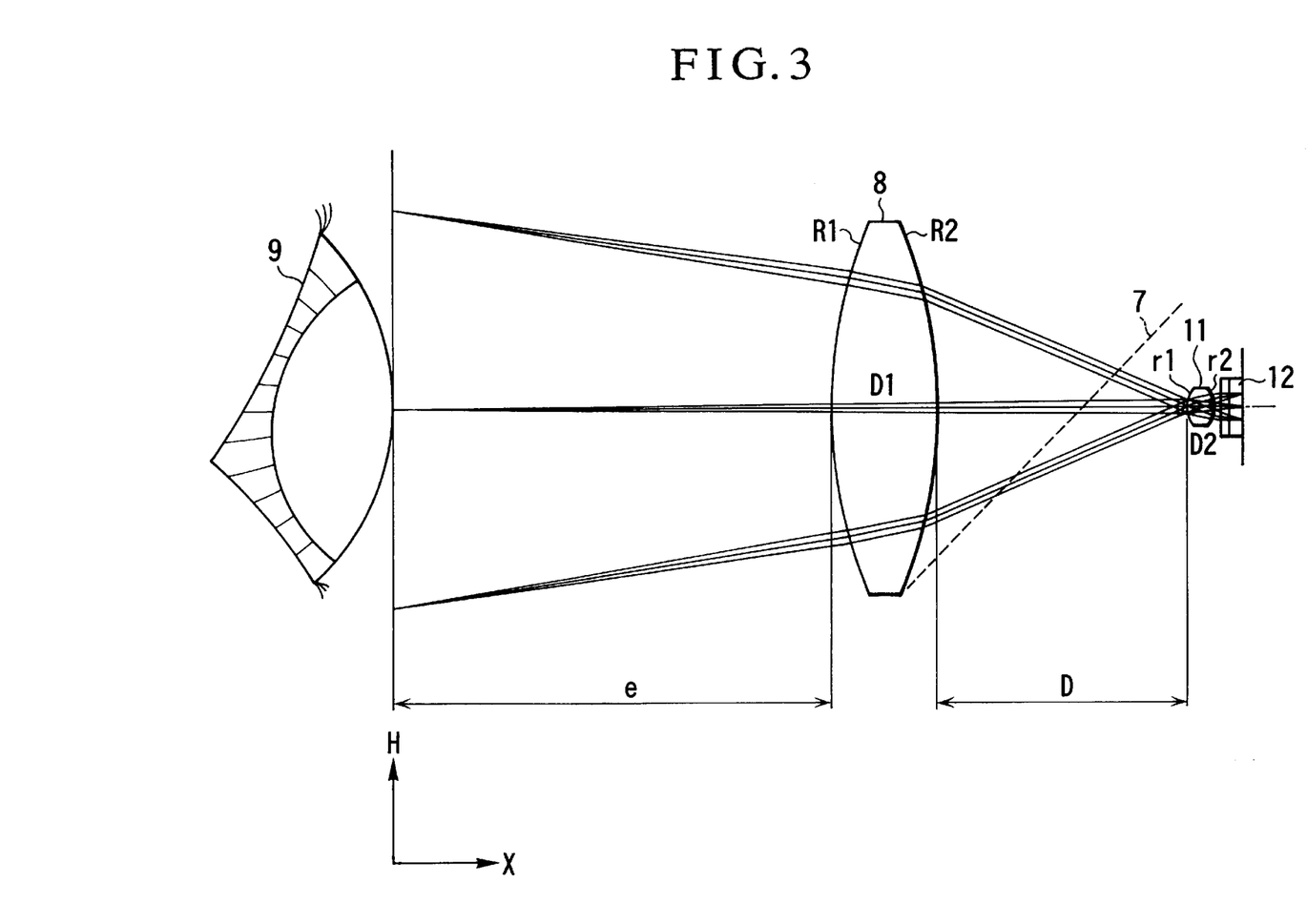
FIG. 3 is an enlarged view showing in part the viewfinder system of the numerical example 1.
Figure 4:
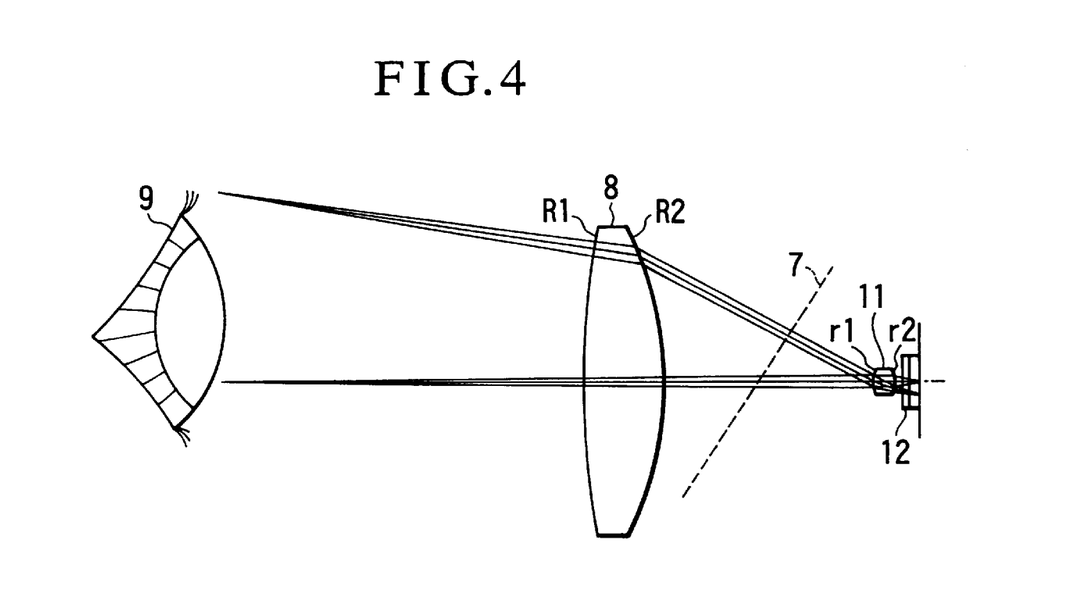
FIG. 4 is an enlarged view showing in part a viewfinder system of a numerical example 2 of this invention.
Figure 5:
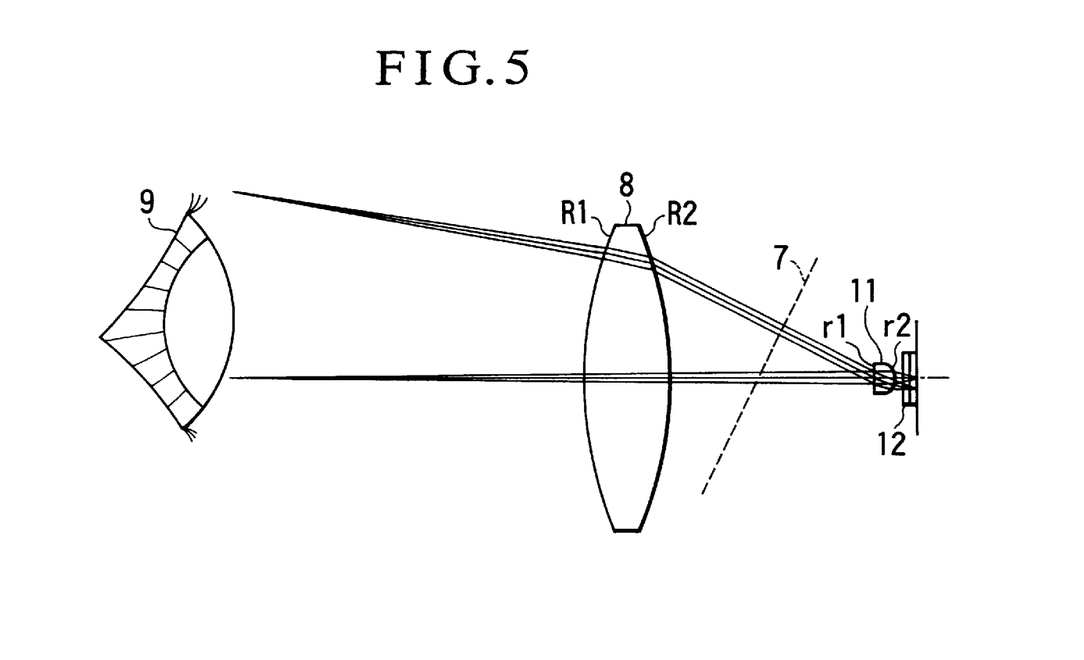
FIG. 5 is an enlarged view showing in part a viewfinder system of a numerical example 3 of this invention.

FIG. 2 schematically shows essential parts of a viewfinder system of a numerical example 1 of the embodiment of this invention. FIG. 3 is an enlarged view showing the optical path of a part of FIG. 2 in a developed state. In FIG. 3, the advancing direction of the optical path of FIG. 2 is reversed. FIGS. 4 and 5 are enlarged views showing in part the numerical examples 2 and 3 of the embodiment of this invention, respectively.

In the embodiment of this invention, a viewfinder system is arranged independently of a photo-taking system and is provided with a visual line detecting means which is disposed in the vicinity of an eyepiece lens of the viewfinder system.

Referring to FIG. 2, an objective lens OL having a magnification varying part is composed of three lenses 1, 2 and 3 and is arranged to vary magnification by moving some of the lenses 1 to 3 in association with a magnification varying action of the photo-taking system (not shown). Reference symbol SP denotes a stop.

An image inverting member 4, such as a Porro prism or a roof prism, is arranged to invert an object image formed by the objective lens OL into a non-inverted erecting image and to guide the non-inverted erecting object image to a liquid crystal focusing screen 6. For simplification of illustration, FIG. 2 shows the image inverting member 4 in a shape of having an optical path developed into a glass block. A field lens 5 is arranged to guide a light beam from the image inverting member 4 toward the liquid crystal focusing screen 6, which serves as a primary image forming plane. The liquid crystal focusing screen (primary image forming plane) 6 is composed of a liquid crystal and is arranged to have the object image, i.e., a viewfinder image, formed thereon by the objective lens OL.

A light beam splitting member 7 is composed of a dichroic mirror, which transmits a visible light and reflects an infrared light. In FIG. 3, the light beam splitting member 7 is indicated by a broken line. An eyepiece lens 8 is composed of a single lens. An eyeball 9 of the viewer (camera operator) is located at an eye point where the viewfinder image formed on the liquid crystal focusing screen 6 by the objective lens OL is viewed through the eyepiece lens 8.

Illuminating means 10 is composed of a light emitting diode, which is arranged to illuminate the eyeball 9 of the viewer with an infrared light for the purpose of detecting a visual line of the eyeball 9 of the viewer. A visual line lens 11 is composed of a single lens. Image pickup means 12 is composed of a two-dimensional solid-state image sensor. In FIG. 3, the optical path through which the light reflected from the eyeball 9 is guided to the image pickup means 12 is shown reversely to the optical path shown in FIG. 2.

Referring to FIGS. 2 and 3, an eyeball image (a light-source-reflected image, a reflected image from the iris part of the eyeball, a Purkinje image (cornea-reflected image) or the like coming from the eyeball 9 illuminated with the infrared light of the illuminating means 10 is reflected through the eyepiece lens 8 by the light beam splitting member 7 and is imaged on the surface of the image pickup means 12 by the visual line lens 11. Information on the visual line of the viewer is obtained in a known manner by using information on the position of the eyeball image which is thus formed on the image pickup means 12.

According to the embodiment as described above, by detecting the direction of the visual line (fixation point) of the viewer, in, for example, a still camera, a video camera or the like, it is possible to find a position which the viewer is looking at on the focal plane or on the viewfinder plane. Then, by using the position information (visual line information) thus obtained, various operations can be performed. For example, in an automatic focus detecting device of the kind having a plurality of distance measuring points not only at the center of an image plane but also at a plurality of other points, when the viewer wishes to have an automatic focus detecting action on one of the distance measuring points by just looking at it, the embodiment enables the camera to carry out an automatic focus detecting action by automatically selecting this particular point as the distance measuring point. The arrangement obviates the necessity of manually selecting and inputting information on one of the plurality of distance measuring points.

In the case of the embodiment, each of the eyepiece lens 8 and the visual line lens 11 is composed of a single lens, which has at least one aspheric lens surface, so that the eyeball image is formed on the surface of the image pickup means 12 with a high degree of resolution.

Numerical examples 1, 2 and 3 of the embodiment of this invention are next described with reference to FIGS. 3, 4 and 5.

Referring to FIG. 3, in the numerical examples 1, 2 and 3, there are shown in numerical values a distance e from the eye point of the eyeball 9 to the eyepiece lens 8, in order from the side of the eyeball 9, the radii of curvature R1 and R2 of the eyepiece lens 8 and the radii of curvature r1 and r2 of the visual line lens 11, the lens thickness D1 of the eyepiece lens 8, the lens thickness D2 of the visual line lens 11, an air space D between the eyepiece lens 8 and the visual line lens 11, the refractive index N1 of the eyepiece lens 8 and the refractive index N2 of the visual line lens 11. Further, with an axis X assumed to be in the direction of the optical axis, an axis H to be perpendicular to the optical axis, the advancing direction of light from the eyeball to be positive, a paraxial radius of curvature to be R, and aspheric coefficients to be K, b, c and d, the aspheric shape is expressed by the following formula:

$$X = \frac{(1/R)H^2}{1+\sqrt{1-(1+K)(H/R)^2}} + bH^4 + cH^6 + dH^8$$

Further, the focal length of the eyepiece lens 8 and the focal length of the visual line lens 11 are respectively expressed as f1 and f2.

(Numerical Example 1)

| R | D | N |
|---|---|---|
| e = 15 | | |
| R1 = 18.209 | D1 = 3.5 | N1 = 1.48484 |
| R2 = −15.28097 | | |
| aspheric coefficients: | | |
| K = −4.4, b = 0, c = 5 × 10⁻⁸, d = 0 | | |

D = 8.8

-continued (Numerical Example 1)

| R | D | N |
|---|---|---|
| r1 = 0.89129 | D2 = 1.0 | N2 = 1.484840 | aspheric coefficients:
K = −2.83057, b = 0, c = 0, d = 0 r2 = −1.11759
aspheric coefficients:
K = 2.262 × 10$^{-1}$, b = −1.96622,
c = 8.96780, d = −1.02278 × 10

R1/R2 = −1.192
r1/r2 = −0.798
D/f1 = 0.496
f1/f2 = 17.742

(Numerical Example 2)

| R | D | N |
|---|---|---|
| | e = 15 | |
| R1 = 27.6334 | D1 = 3.5 | N1 = 1.48484 | aspheric coefficients:
K = 0.10253, b = −8.4689 × 10$^{-5}$,
c = −2.01808 × 10$^{-7}$, d = 0

R2 = −13.336
| | D = 8.8 | |
| r1 = 0.84775 | D2 = 1.0 | N2 = 1.48484 | aspheric coefficients:
K = −2.99198, b = 0, c = 0, d = 0 r2 = −1.26282
aspheric coefficients:
K = 3.02129, b = −3.68903
c = 2.28027 × 10, d = −3.60645 × 10

R1/R2 = −2.072
r1/r2 = −0.671
D/f1 = 9.461
f1/f2 = 15.416

(Numerical Example 3)

| R | D | N |
|---|---|---|
| | e = 15 | |
| R1 = 18.209 | D1 = 3.5 | N1 = 1.48484 |
| R2 = −15.28097 | | | aspheric coefficients:
K = −4.4, b = 0, c = 5 × 10$^{-8}$, d = 0

| | D = 8.8 | |
| r1 = 1.50557 | D2 = 1.0 | N2 = 1.48484 | aspheric coefficients:
K = −2.43304 × 10$^2$, b = 0, c = 0, d = 0 r2 = −0.56015
aspheric coefficients:
K = −7.49222 × 10$^{-1}$, b = −1.87415, c = 9.47971,
d = −1.57094 × 10

R1/R2 = −1.192
r1/r2 = −2.689
D/f1 = 0.496
f1/f2 = 17.742

According to the arrangement of the embodiment described above, while a distance between the eyepiece lens 8 and the primary image forming plane (liquid crystal focusing screen) 6 is arranged to be short, an aspheric lens is used for each of the eyepiece lens 8 and the visual line lens 11 for the purpose of correcting and making compatible a distortion arising in viewing the viewfinder image on the primary image forming plane 6 through the eyepiece lens 8 and a distortion arising when the eyeball image is formed on the image pickup means 12 by the visual line lens 11 through the eyepiece lens 8. Particularly, it is a feature of the embodiment that each of the eyepiece lens 8 and the visual line lens 11 is arranged to be composed of a single lens by virtue of the use of the aspheric surface. These lenses, therefore, can be simply arranged and yet they ensure adequate correction of the aberrations.

While the viewfinder system having the visual line detecting means is arranged by setting each of its elements according to this invention as described above, the viewfinder system is preferably arranged to meet at least one of the following conditions:

(A1) When a light flux from the illuminating means 10 for visual line detection is reflected between the surface R1 of the eyepiece lens 8 and the surface of a spectacle lens of the viewer, the light reflected might become a ghost image. To solve this problem, the embodiment is arranged as follows. In order to adequately correct a curvature of field and a spherical aberration arising when the viewfinder image is viewed through an eyepiece lens of a short focal length (having a strong power) and also to prevent the ghost image from taking place, the following conditions is satisfied:

$$-2.5 < R1/R2 < -0.5 \quad (1)$$

$$R1 < 40 \text{ mm} \quad (2)$$

A failure to meet the lower limit value of the condition formula (1) makes the correction of the curvature of field difficult. A failure to meet the upper limit of the formula (1) makes the correction of the spherical aberration difficult. A failure to meet the condition formula (2) increases the possibility of occurrence of the ghost image.

(A2) For reduction in size, a solid-state image sensor of a considerably small size is employed as the image pickup means 12. Therefore, the visual line lens 11 must be of a short focal length. Especially in the event of a viewfinder system of a lens-shutter type compact camera, the sizes of these parts must be very small. In view of this, to secure a distance from the visual line lens 11 to the image pickup means 12 and to correct the distortion in a balanced state, the embodiment is arranged to satisfy the following condition:

$$-3 < r1/r2 < -0.5 \quad (3)$$

A failure to meet the lower limit value of the condition formula (3) makes the correction of the distortion difficult. A failure to meet the upper limit of the formula (3) makes it difficult to secure a required amount of back focal distance.

(A3) To ensure that aberrations and especially the curvature of field are adequately corrected, the amount of the aspheric surface of the lens surface r2 is preferably arranged to be larger than that of the lens surface r1.

(A4) In order to efficiently converge a part of the light flux emitted from the illuminating means 10 and reflected by the eyeball and to arrange the eyepiece lens 8 as small as possible, it is important to appositely set a distance between the eyepiece lens 8 and the eye point, the focal length of the eyepiece lens 8 and a distance between the eyepiece lens 8 and the visual line lens 11. To meet this requirement, this invention is arranged to cause a principal ray of the light reflected by the eye to exit from the eyepiece lens 8 in a shape close to a telecentric shape, i.e., in a shape close to parallel beams of light. For this purpose, the embodiment is arranged to satisfy the following condition:

$$0.4 < D/f1 < 0.6 \quad (4)$$

A failure to meet the lower limit value of the condition formula (4) makes it difficult to secure a sufficient quantity of marginal light. A failure to meet the upper limit makes it difficult to secure a required amount of back focal distance.

(A5) For an adequate optical performance of the embodiment, the embodiment is preferably arranged to satisfy the following condition:

$$0.7 < e/f1 < 1.4 \quad (5)$$

A failure to meet the lower limit value of he condition formula (5) would result in a large angle of incidence due to the arrangement of the illuminating means 10. The large angle of incidence then causes the quantity of the reflected light advancing to the visual line lens 11 to become insufficient. A failure to meet the upper limit of the condition formula (5) causes the eyepiece lens 8 to become larger or makes it difficult to secure a sufficient quantity of marginal light.

(A6) As compared with the focal length of the eyepiece lens 8, the focal length of the visual line lens 11 is arranged to be small for obtaining some reduction rate. In this case, it is advantageous in respect of correction of aberrations to disperse the power of the visual line lens 11 by increasing the refractive power of the eyepiece lens 8. However, excessive reduction in power of the visual line lens 11 would cause an image forming magnification to become too large or an optical path length to become too long. Therefore, the embodiment is arranged to satisfy the following condition:

$$10 < f1/f2 < 20 \quad (6)$$

A failure to meet the lower limit value of the condition formula (6) causes the magnification of the visual line lens 11 to become excessive and thus results in an increase in size of the lens system. A failure to meet the upper limit of the formula (6) causes the whole optical path length of the lens system to become longer and is, therefore, not desirable.

In the viewfinder system according to the embodiment of this invention as described above, the lens arrangement of the eyepiece lens 8 and that of the visual line lens 11 are appositely set so that the eyeball image can be formed on the image sensor with a high degree of resolution to permit highly accurate detection of information on the visual line of the eyeball and yet the whole optical system can be simply arranged.

Figure 6A:
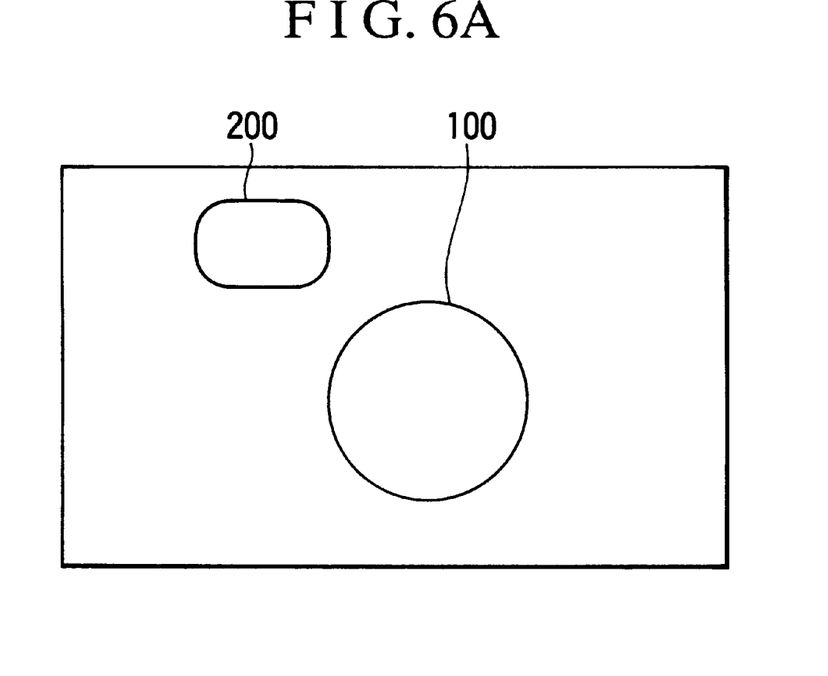
FIGS. 6A and 6B are front and side views, respectively, of a compact camera having a viewfinder system arranged in accordance with this invention.
Figure 6B:
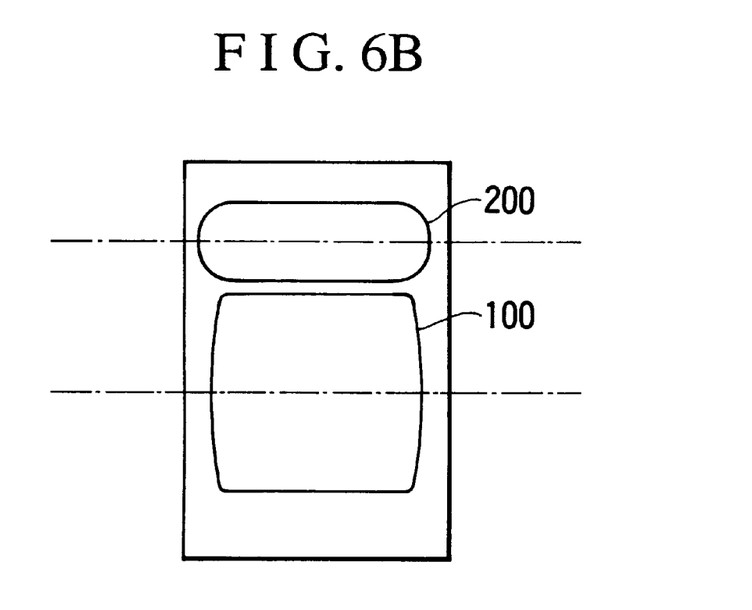

Further, with each of the eyepiece lens 8 and the visual line lens 11 arranged to have at least one aspheric surface, the distortion and the image curvature of the eyeball image taking place through the eyepiece line lens 11 can be adequately corrected. Besides, since each of the eyepiece lens 8 and the visual line lens 11 is arranged to be composed of a single lens, the embodiment is applicable even to a compact camera, such as a camera shown in FIGS. 6(A) and 6(B), having severe conditions in respect of cost and size. FIG. 6(A) shows in a front view a compact camera in which a viewfinder system 200 according to the embodiment of this invention is arranged independently of a photo-taking system 100. FIG. 6(B) is a side view of the same compact camera.

What is claimed is:

1. A viewfinder system comprising:
   an eyepiece lens having at least one aspheric surface; and
   visual line detecting means including:
   illuminating means for illuminating an eyeball of a viewer;
   a visual line lens arranged to form an eyeball image by using light reflected from the eyeball of the viewer, said visual line lens having at least one aspheric surface;
   detection means on which the eyeball image is formed, said visual line detecting means detecting a visual line of the viewer by using information outputted from said detection means; and
   each of said eyepiece lens and said visual line lens is composed of a single lens, wherein said eyepiece lens is composed of a single lens, said viewfinder system satisfying the following conditions:

$$-2.5 < R1/R2 < -0.5$$

$$R1 < 40 \text{ mm}$$

where R1 and R2 are radii of curvature of respective lens surfaces of said eyepiece lens in order from the side of the viewer.

2. A viewfinder system according to claim 1, further comprising:
   an objective lens; and
   image inverting means for inverting an image formed by said objective lens.

3. A viewfinder system comprising:
   an eyepiece lens having at least one aspheric surface; and
   visual line detecting means including:
   illuminating means for illuminating an eyeball of a viewer;
   a visual line lens arranged to form an eyeball image by using light reflected from the eyeball of the viewer, said visual line lens having at least one aspheric surface;
   detection means on which the eyeball image is formed, said visual line detecting means detecting a visual line of the viewer by using information outputted from said detection means; and
   each of said eyepiece lens and said visual line lens is composed of a single lens, wherein said visual line lens is composed of a single lens, said viewfinder system satisfying the following condition:

$$-3 < r1/r2 < -0.5$$

where r1 and r2 are radii of curvature of respective lens surfaces of said visual line lens in order from the side of the viewer.

4. A viewfinder system according to claim 3, further comprising:
   an objective lens; and
   image inverting means for inverting an image formed by said objective lens.

5. A viewfinder system comprising:
   an eyepiece lens having at least one aspheric surface; and
   visual line detecting means including:
   illuminating means for illuminating an eyeball of a viewer;
   a visual line lens arranged to form an eyeball image by using light reflected from the eyeball of the viewer, said visual line lens having at least one aspheric surface;

detection means on which the eyeball image is formed, said visual line detecting means detecting a visual line of the viewer by using information outputted from said detection means; and each of said eyepiece lens and said visual line lens is composed of a single lens, wherein each of said eyepiece lens and said visual line lens is composed of a single lens, said viewfinder system satisfying the following conditions:

$$-2.5 < R1/R2 < -0.5$$

$$R1 < 40 \text{ mm}$$

$$-3 < r1/r2 < -0.5$$

where R1 and R2 are radii of curvature of respective lens surfaces of said eyepiece lens in order from the side of the viewer, and r1 and r2 are radii of curvature of respective lens of said visual line lens in order from the side of the viewer.

6. A viewfinder system according to claim 5, further comprising:

an objective lens; and image inverting means for inverting an image formed by said objective lens.

7. A viewfinder system comprising:

an eyepiece lens having at least one aspheric surface; and visual line detecting means including:

illuminating means for illuminating an eyeball of a viewer;

a visual line lens arranged to form an eyeball image by using light reflected from the eyeball of the viewer, said visual line lens having at least one aspheric surface;

detection means on which the eyeball image is formed, said visual line detecting means detecting a visual line of the viewer by using information outputted from said detection means; and each of said eyepiece lens and said visual line lens is composed of a single lens, satisfying the following condition:

$$0.4 < D/f1 < 0.6$$

where f1 is the focal length of said eyepiece lens, and D is a distance between said eyepiece lens and said visual line lens.

8. A viewfinder system according to claim 7, further comprising:

an objective lens; and image inverting means for inverting an image formed by said objective lens.

9. A viewfinder system comprising:

an eyepiece lens having at least one aspheric surface; and visual line detecting means including:

illuminating means for illuminating an eyeball of a viewer;

a visual line lens arranged to form an eyeball image by using light reflected from the eyeball of the viewer, said visual line lens having at least one aspheric surface;

detection means on which the eyeball image is formed, said visual line detecting means detecting a visual line of the viewer by using information outputted from said detection means; and each of said eyepiece lens and said visual line lens is composed of a single lens, satisfying the following condition:

$$10 < f1/f2 < 20$$

where f1 is a focal length of said eyepiece lens, and f2 is a focal length of said visual line lens.

10. A viewfinder system according to claim 9, further comprising:

an objective lens; and image inverting means for inverting an image formed by said objective lens.

11. An optical apparatus comprising:

a viewfinder system having a primary image forming plane including:

an objective lens;

image inverting means for inverting an image formed by said objective lens;

an eyepiece lens having at least one aspheric surface wherein a viewer observes the image formed by said objective lens through said image inverting means and said eyepiece lens; and visual line detecting means including:

illuminating means for illuminating an eyeball of the viewer;

a visual line lens arranged to form an eyeball image by using light reflected from the eyeball of the viewer, said visual line lens having at least one aspheric surface; and detection means on which the eyeball image is formed, said visual line detecting means detecting a visual line of the viewer by using information outputted from said detection means;

the aspheric surfaces of said eyepiece lens and said visual line lens correcting and making compatible a distortion arising in viewing a viewfinder image on the primary image forming plane through the eyepiece lens and a distortion arising when the eyeball image is formed on the detection means by the visual line lens through the eyepiece lens, and a photographic system wherein said viewfinder system is provided independently on said photographic system.

12. An optical apparatus according to claim 11, wherein each of said eyepiece lens and said visual line lens is composed of a single lens.

13. An optical apparatus according to claim 11, further comprising a photo-taking system having an optical axis different from an optical axis of said viewfinder system.

14. An optical apparatus comprising:

a viewfinder system including:

an eyepiece lens having at least one aspheric surface; and visual line detecting means including:

illuminating means for illuminating an eyeball of a viewer;

a visual line lens arranged to form an eyeball image by using light reflected from the eyeball of the viewer, said visual line lens having at least one aspheric surface; and detection means on which the eyeball image is formed, said visual line detecting means detecting a visual line of the viewer by using information outputted from said detection means; and a photographic system, wherein said viewfinder system is provided independently on said photographic system, wherein said eyepiece is composed of a single lens, said optical apparatus satisfying the following conditions:

$$-2.5 < R1/R2 < -0.5$$

$$R1 < 40 \text{ mm}$$

where R1 and R2 are radii of curvature of respective lens surfaces of said eyepiece lens in order from the side of the viewer.

15. An optical apparatus according to claim 14, wherein said viewfinder system further includes:
an objective lens; and
image inverting means for inverting an image formed by said objective lens.

16. An optical apparatus comprising:
a viewfinder system including:
an eyepiece lens having at least one aspheric surface; and
visual line detecting means including:
illuminating means for illuminating an eyeball of a viewer;
a visual line lens arranged to form an eyeball image by using light reflected from the eyeball of the viewer, said visual line lens having at least one aspheric surface; and
detection means on which the eyeball image is formed, said visual line detecting means detecting a visual line of the viewer by using information outputted from said detection means; and
a photographic system, wherein said viewfinder system is provided independently on said photographic system, wherein said visual line lens is composed of a single lens, said optical apparatus satisfying the following condition:

$-3 < r1/r2 < -0.5$ where r1 and r2 are radii of curvature of respective lens surfaces of said visual line lens in order from the side of the viewer.

17. An optical apparatus according to claim 16, wherein said viewfinder system further includes:
an objective lens; and
image inverting means for inverting an image formed by said objective lens.

18. An optical apparatus comprising:
a viewfinder system including:
an eyepiece lens having at least one aspheric surface; and
visual line detecting means including:
illuminating means for illuminating an eyeball of a viewer;
a visual line lens arranged to form an eyeball image by using light reflected from the eyeball of the viewer, said visual line lens having at least one aspheric surface; and
detection means on which the eyeball image is formed, said visual line detecting means detecting a visual line of the viewer by using information outputted from said detection means; and
a photographic system, wherein said viewfinder system is provided independently on said photographic system, wherein each of said eyepiece lens and said visual line lens is composed of a single lens, said optical apparatus satisfying the following conditions:

$-2.5 < R1/R2 < -0.5$ $R1 < 40 \text{ mm}$ $-3 < r1/r2 < -0.5$ where R1 and R2 are radii of curvature of respective lens surfaces of said eyepiece lens in order from the side of the viewer, and r1 and r2 are radii of curvature of respective lens surfaces of said visual line lens in order from the side of the viewer.

19. An optical apparatus according to claim 18, wherein said viewfinder system further includes:
an objective lens; and
image inverting means for inverting an image formed by said objective lens.

20. An optical apparatus comprising:
a viewfinder system including:
an eyepiece lens having at least one aspheric surface; and
visual line detecting means including:
illuminating means for illuminating an eyeball of a viewer;
a visual line lens arranged to form an eyeball image by using light reflected from the eyeball of the viewer, said visual line lens having at least one aspheric surface; and
detection means on which the eyeball image is formed, said visual line detecting means detecting a visual line of the viewer by using information outputted from said detection means; and
a photographic system, wherein said viewfinder system is provided independently on said photographic system, wherein each of said eyepiece lens and said visual line lens is composed of a single lens, said optical apparatus satisfying the following condition:

$0.4 < D/f1 < 0.6$ where f1 is a focal length of said eyepiece lens, and D is a distance between said eyepiece lens and said visual line lens.

21. An optical apparatus according to claim 20, wherein said viewfinder system further includes:
an objective lens; and
image inverting means for inverting an image formed by said objective lens.

22. An optical apparatus, comprising:
a viewfinder system including:
an eyepiece lens having at least one aspheric surface; and
visual line detecting means including;
illuminating means for illuminating an eyeball of a viewer;
a visual line lens arranged to form an eyeball image by using light reflected from the eyeball of the viewer, said visual line lens having at least one aspheric surface; and
detection means on which the eyeball image is formed, said visual line detecting means detecting a visual line of the viewer by using information outputted from said detection means; and
a photographic system, wherein said viewfinder system is provided independently on said photographic system, wherein each of said eyepiece lens and said visual line lens is composed of a single lens, said optical apparatus satisfying the following condition:

$10 < f1/f2 < 20$ where f1 is a focal length of said eyepiece lens, and f2 is a focal length of said visual line lens.

23. An optical apparatus according to claim 22, wherein said viewfinder system further includes:
an objective lens; and
image inverting means for inverting an image formed by said objective lens.

* * * * *